(12) United States Patent
George, Jr.

(10) Patent No.: US 6,739,792 B1
(45) Date of Patent: May 25, 2004

(54) AMPLIFIER SECURING CLAMP

(76) Inventor: James D. George, Jr., 745 Caldwell St., Quincy, FL (US) 32351

( * ) Notice: Subject to any disclaimer, the term of this patent is extended or adjusted under 35 U.S.C. 154(b) by 798 days.

(21) Appl. No.: 09/655,047

(22) Filed: Sep. 5, 2000

(51) Int. Cl.[7] ................................................ F16B 21/00
(52) U.S. Cl. .................... 403/322.1; 403/321; 403/331; 403/373; 403/374.1; 403/374.2; 381/87; 70/14; 70/19
(58) Field of Search ........................... 381/86, 87, 334; 269/243, 247, 291; 248/225.11, 225.21; 292/175; 70/14, 19, 58; 403/230, 245, 252, 253, 256, 257, 263, 321, 322.1, 322.3, 322.4, 323, 331, 363, 373, 374.1, 374.2, 374.5, 409.1

(56) References Cited

U.S. PATENT DOCUMENTS

| | | | | | |
|---|---|---|---|---|---|
| 4,627,589 | A | * | 12/1986 | Hotsumi ................ | 248/346.03 |
| 4,924,683 | A | * | 5/1990 | Derman ........................ | 70/14 |
| 5,438,787 | A | * | 8/1995 | McMaster et al. ............ | 42/106 |
| 5,705,975 | A | * | 1/1998 | Serino et al. .......... | 340/426.34 |
| 5,819,561 | A | * | 10/1998 | Blehi, III ........................ | 70/14 |
| 5,875,600 | A | * | 3/1999 | Redman .................... | 52/656.4 |

\* cited by examiner

Primary Examiner—John R. Cottingham
Assistant Examiner—Michael P. Ferguson
(74) Attorney, Agent, or Firm—John Wiley Horton (57) ABSTRACT

An adjustable key-locked clamp for securing car stereo equipment against a mounting surface. A single rotary lock fixes the adjustable clamping member and secures the clamp to its base. A key is required to release the clamping member and remove the device from its base. Thus, without the key, it is very difficult to remove the car stereo equipment.

2 Claims, 10 Drawing Sheets

AMPLIFIER SECURING CLAMP

BACKGROUND OF THE INVENTION

1. Field of the Invention

This invention relates to the field of car stereo equipment. More specifically, the invention comprises an adjustable key-locked clamp for securing car stereo equipment against a mounting surface. A single rotary lock fixes the adjustable clamping member and secures the clamp to its base.

2. Background

Figure 1:
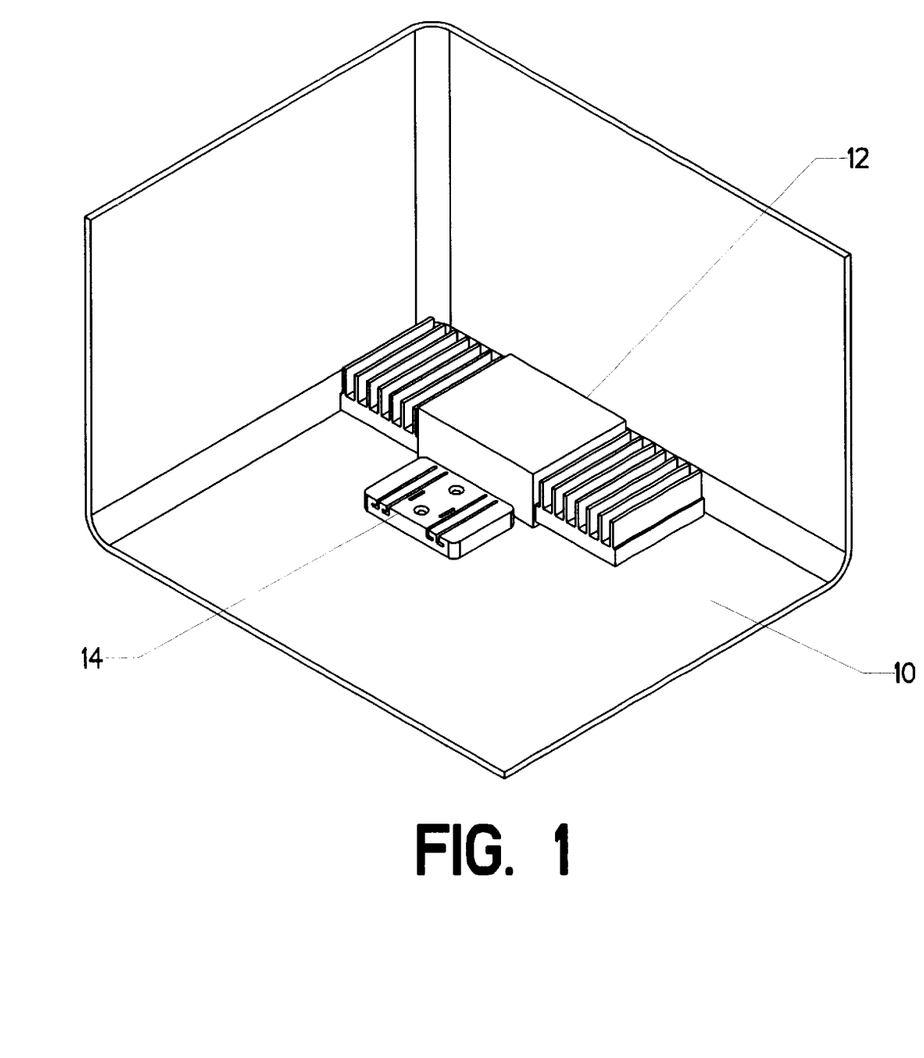
FIG. 1 is an isometric view, showing a power amplifier mounted in the trunk of a car.

Modern car stereos often employ large power amplifiers. The bulk of these devices—along with their heat dissipation requirements—require that they be mounted in the vehicle's trunk. They are typically screwed to the trunk floor or wall. FIG. 1 shows a typical installation of amplifier 12. It is shown mounted to the bottom wall of an automotive trunk 10. Amplifier 12 is typically mounted using screws or adhesive strips.

Unfortunately, as high-quality amplifiers are expensive, theft has become a problem. It is therefore desirable to create a securing device which will deter the theft of these components. It is also desirable to make such a device adjustable, since power amplifiers come in many different shapes and sizes.

BRIEF DESCRIPTION OF THE INVENTION

Accordingly, several objects and advantages of the present invention are:

1. To provide a device for securing a power amplifier to an automobile, so that only a user with a key can remove it;
2. To provide an adjustable locking device which can be used to secure many different sizes and shapes of power amplifiers; and
3. To use a single mechanism to both fix the adjustable component in place and lock the clamp to the power amplifier.

REFERENCE NUMERALS IN DRAWINGS

| | |
|---|---|
| 10 | trunk |
| 12 | amplifier |
| 14 | base |
| 16 | mounting hole |
| 18 | undercut slot |
| 20 | latch receptacle |
| 22 | foot |
| 24 | latch |
| 26 | cleat |
| 28 | latch cavity |
| 30 | camming fin |
| 32 | housing |
| 34 | clamp |
| 36 | pin boss |
| 38 | pin |
| 40 | wheel |
| 42 | pressure plate |
| 44 | cam boss |
| 46 | lock mount |
| 48 | lock |
| 50 | rotary cam |
| 52 | bearing |
| 54 | latch plate |
| 56 | retaining rib |
| 58 | retaining flange |
| 60 | cam groove |
| 62 | pin groove |

DETAILED DESCRIPTION OF THE INVENTION

FIG. 1 shows amplifier 12 positioned within automobile trunk 10 (automobile trunk 10 is obviously a simplified representation). Amplifier 12 is typically secured by screws, hook-and-pile fastener strips, or bonding tape. In the event of a robbery, any of these securing methods may be easily defeated. The present invention seeks to remedy this problem. Base 14 is bolted in place immediately adjacent amplifier 12. As shown, it is typically bolted to the floor panel of trunk 10.

Figure 2A:
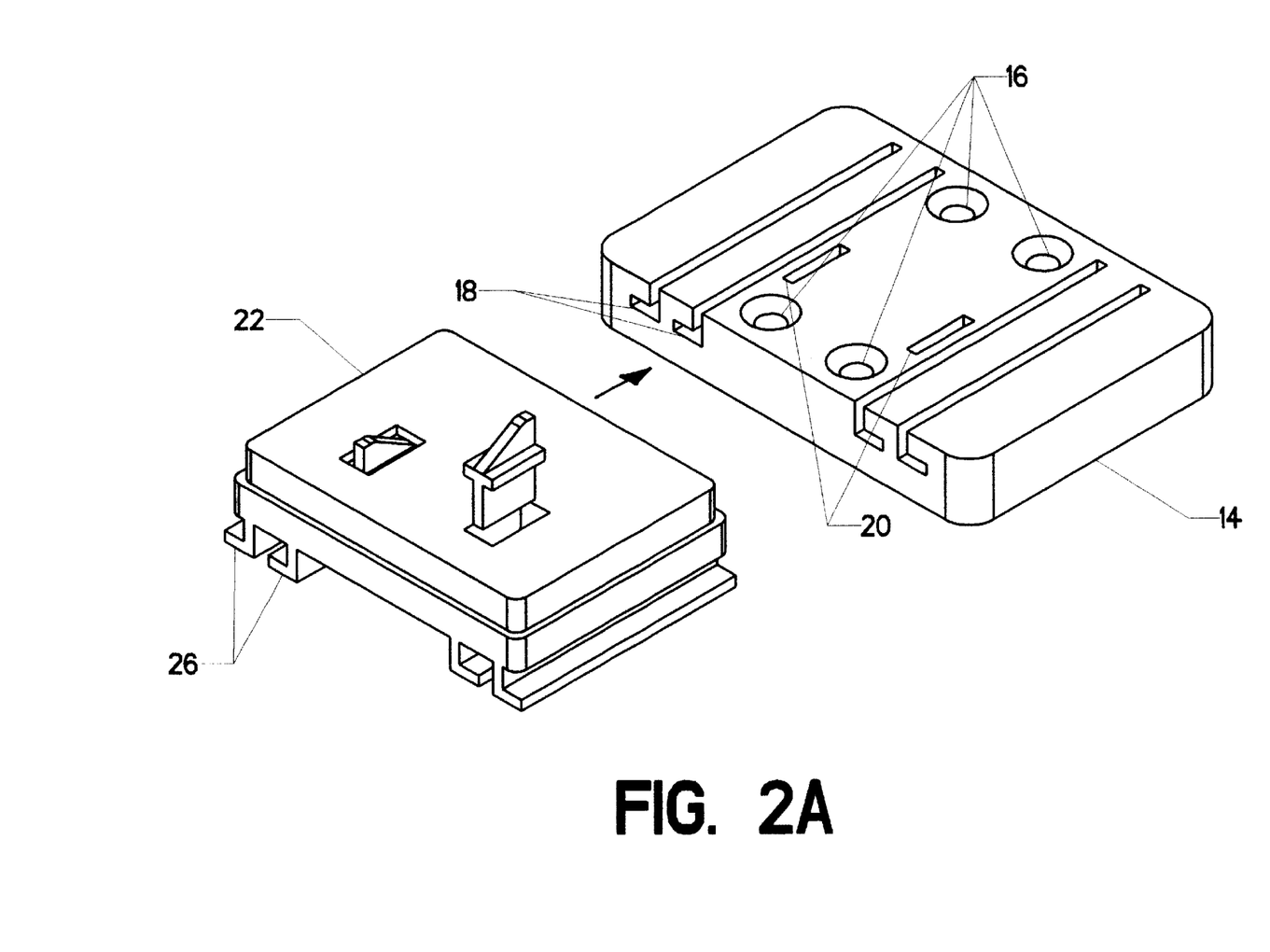
FIG. 2 is an isometric view with a cutaway, showing the base and foot components.

FIG. 2A shows base 14 in greater detail. It is secured by placing bolts through mounting holes 16. These bolts may be installed and removed using conventional tools. However, as will be made clear in the following, the invention does not allow an unauthorized user to access the securing bolts.

Base 14 has four undercut slots 18. The reader will observe that these are in the shape of the letter "L." They carry through the body of base 14 and out the front wall. They do not carry out the rear wall. Foot 22 is designed to lock into base 14. Foot 22 has four cleats 26 descending from its lower surface. The reader will observe that these cleats 26 are sized and positioned to snugly engage the undercut slots 18 in base 14, when foot 22 is pushed onto base 14 in the direction indicated by the arrow. Because undercut slots 18 do not go all the way through to the rear wall of base 14, foot 22 will come to a hard stop when the user slides it onto base 14. It is important to realize that the only way to disengage foot 22 from base 14 is by sliding foot 22 in the reverse of the direction indicated by the arrow.

Figure 2B:
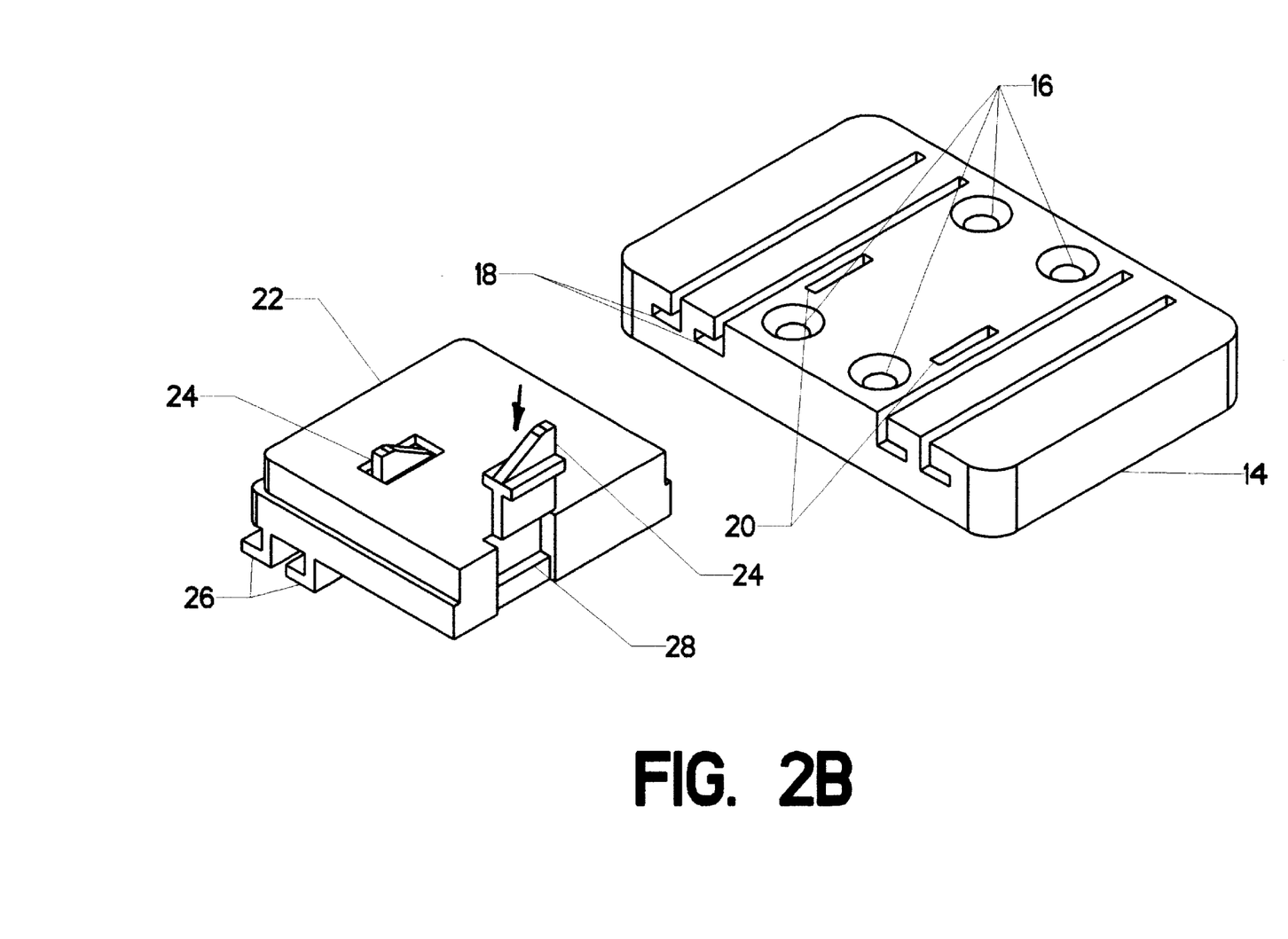

FIG. 2B shows foot 22 with a portion cut away in order to reveal some of its internal details. Foot 22 has two latch cavities 28. These line up with two latch receptacles 20 in base 14 (when foot 22 is locked into base 14). Two latches 24 are positioned within latch cavities 28. Although these fit snugly within latch cavities 28, they are free to move up and down. Each latch 24 is configured so that when it is pressed down as indicated, the lower portion protrudes beyond the bottom surface of foot 22 and down into latch receptacle 20 on base 14. Thus, when the two latches 24 are extended downward, foot 22 is prevented from sliding relative to base 14. In this situation, foot 22 is locked to base 14.

Springs are placed under each latch 24 within each latch cavity 28. These springs bias each latch 24 upward, so that foot 22 is not normally locked to base 14. Only when latches 24 are pressed downward are the two components locked together. As such springs are well known to those skilled in the art, they have not been illustrated.

A camming fin 30 is located on the top of each latch 24. Camming fins 30 are acted upon by other components to force latches 24 downward—as will be explained subsequently.

Figure 3:
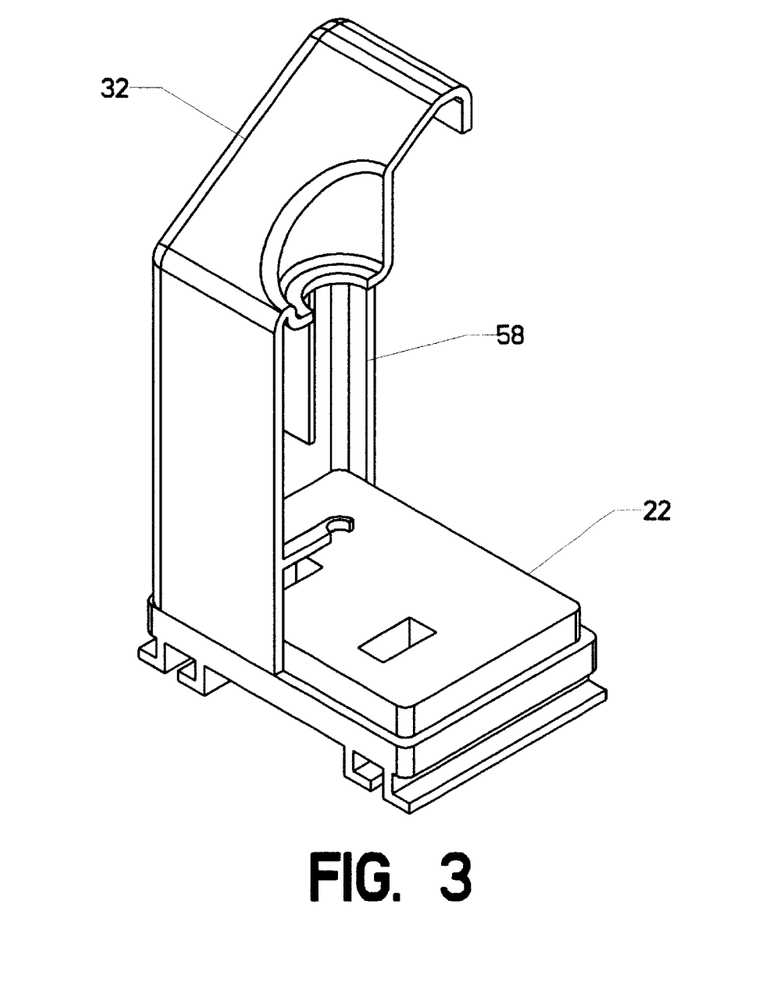
FIG. 3 is an isometric view with a cutaway, showing the housing attached to the foot.

FIG. 3 shows foot 22 with housing 32 attached and extending upward. Housing 32 is shown as a cutaway in order to illustrate its thin-walled nature. In actuality, housing 32 covers all of foot 22. The rear portion of housing 32 is open. This open area is bordered on each side by a retaining flange 58 (because of the cutaway view, only one side is illustrated).

Figure 4:
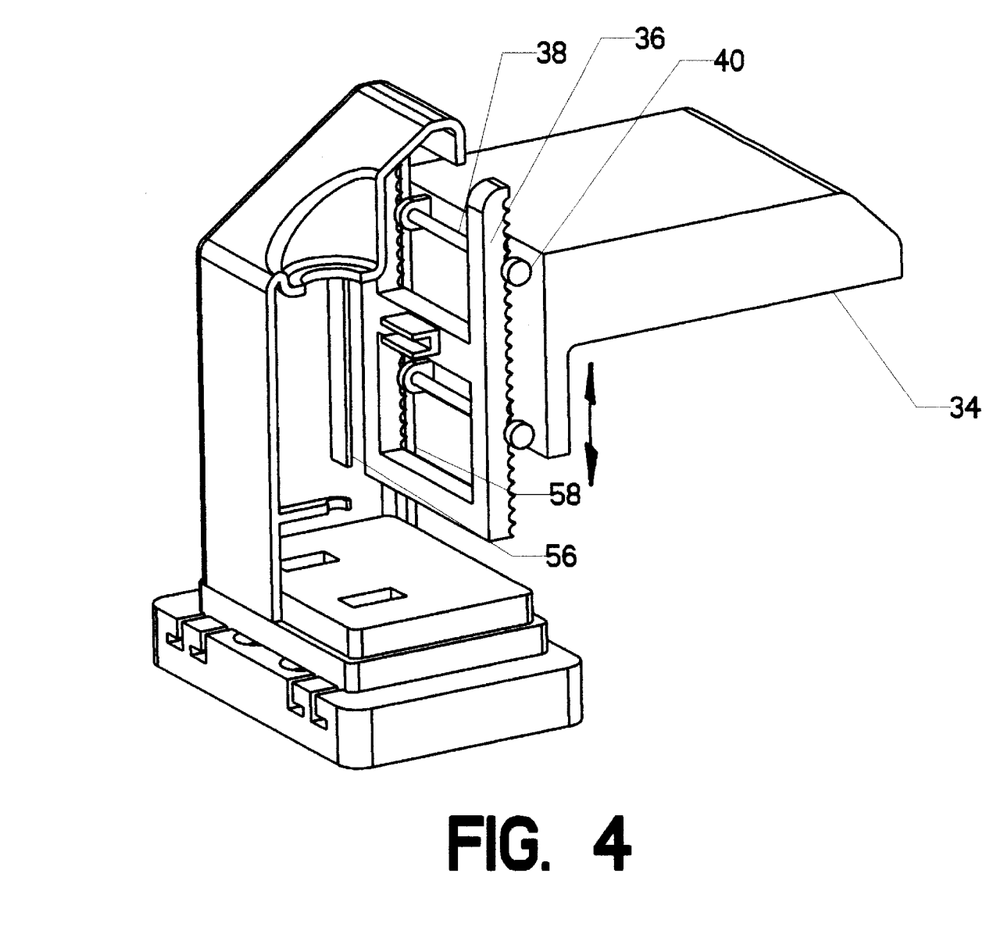
FIG. 4 is an isometric view with a cutaway, showing housing with the adjustable sliding member in position.

FIG. 4 shows foot 22, with housing 32 attached, placed on base 14. Clamp 34 is positioned to slide up and down along the rear portion of housing 32. The forward portion of clamp 34 has four pin bosses 36. These pin bosses mount two freely rotating pins 38. A wheel 40 is formed on both ends of each pin 38. As clamp 34 is moved up and down, wheels 40 roll along retaining flange 58.

Clamp 34 is freely adjustable. However, in order for the invention to function properly, it must be possible to lock clamp 34 in a desired position. A locking member is needed. Each side wall of housing 32 also has a retaining rib 56, positioned to hold this locking member in place within housing 32.

Figure 5:
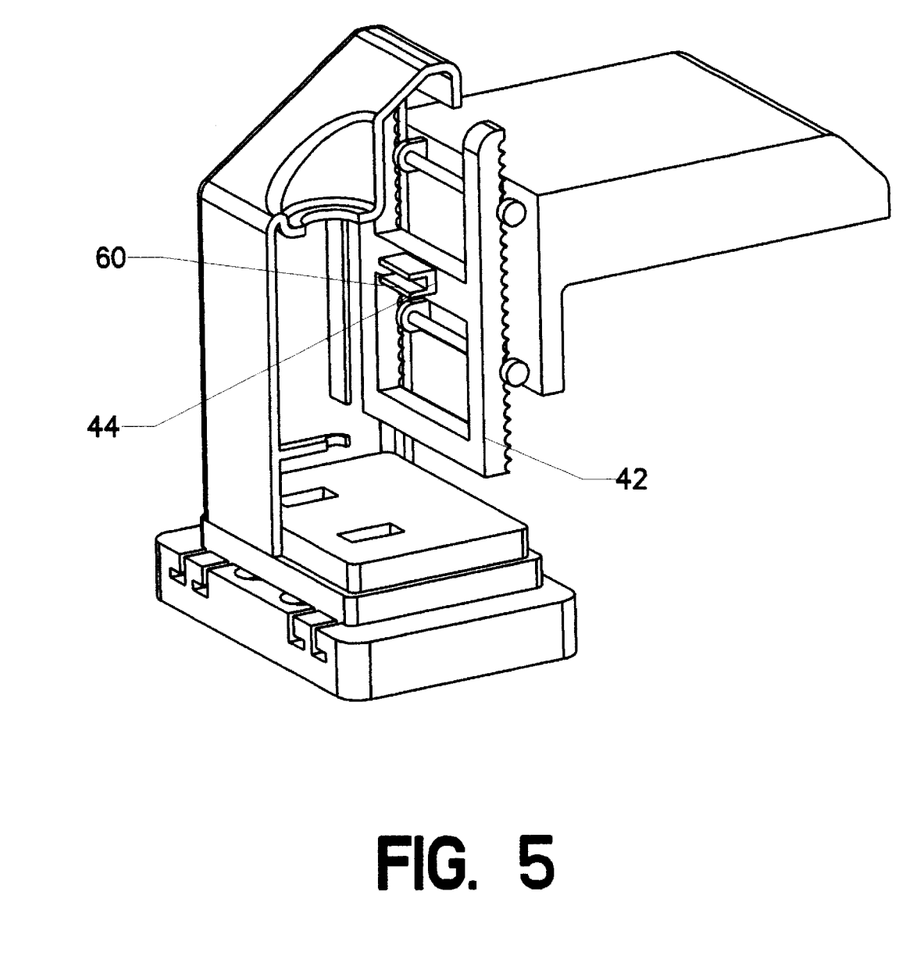
FIG. 5 is an isometric view with a cutaway, showing additional internal components.
Figure 6:
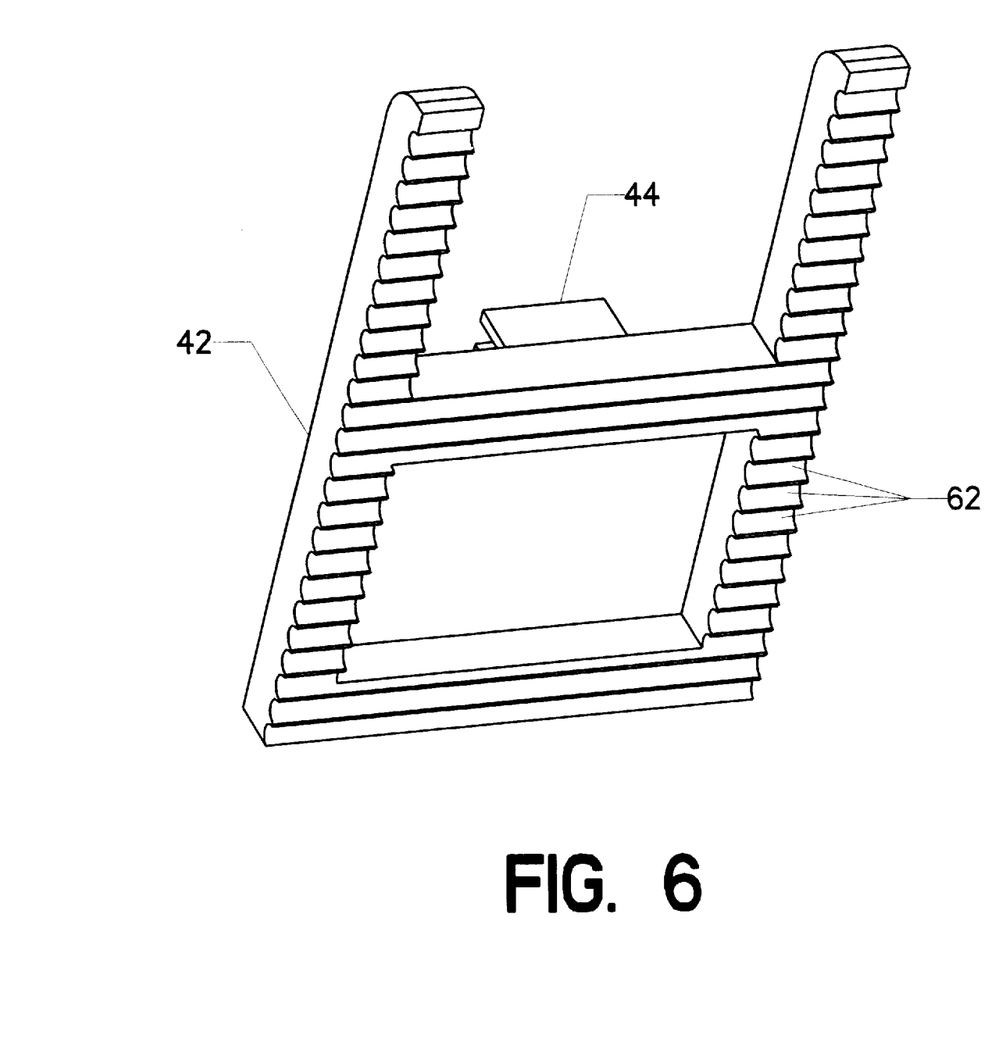
FIG. 6 is an isometric view, showing the pressure plate in greater detail.

FIG. 5 illustrates the locking member itself—pressure plate 42. The forward surface of pressure plate 42 has cam boss 44. Cam groove 60 is cut across cam boss 44. FIG. 6 illustrates pressure plate 42 in greater detail. The rear face of pressure plate 42 has a plurality of pin grooves 64. Pin grooves 64 are sized to fit snugly over pins 38. Returning to FIG. 5, the reader will observe that if pressure plate 42 is forced rearward (indicated by the arrow), pin grooves 64 will engage pins 38, and wheels 40 will be pressed against the two retaining flanges 58. If pressure plate 42 is restricted from moving up and down, clamp 34 will be locked in vertical position by the action of pressure plate 42.

Figure 7:
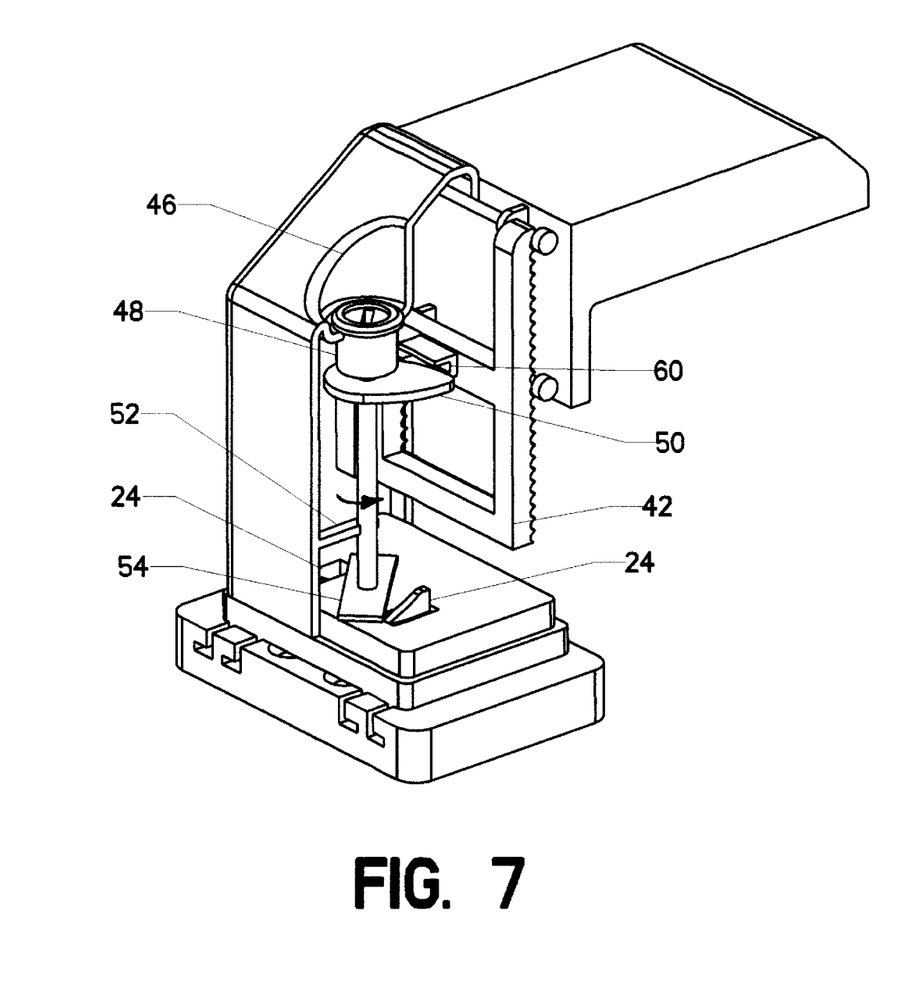
FIG. 7 is an isometric view with a cutaway, showing the complete assembly in the unlatched position.

FIG. 7 illustrates the mechanisms for forcing pressure plate 42 rearward, and for forcing latches 24 downward. Lock 48 is secured within lock mount 46. Lock 48 is of the typical drum variety. When a key is inserted in the slot shown, it is possible to rotate lock 48 through a 45 degree arc. The shaft of lock 48 has two significant features rigidly attached thereto. Rotary cam 50 is positioned immediately below the cylinder. Latch plate 54 is at the lower end of the lock shaft. The reader will observe that bearing 52 is provided to stabilize the lock shaft (Bear in mind that housing 32 is still shown as a ½ cutaway).

As lock 48 is rotated in the direction indicated, rotary cam 50 engages cam groove 60 and forces pressure plate 42 against pins 38. Simultaneously, latch plate 54 is rotated and bears against the camming fin 30 on the top of each latch 28. The two latches 28 are oriented oppositely so that the rotary motion of latch plate 54 forces both latches downward.

It is important to realize that rotary cam 50 never completely disengages from cam groove 60, even in the fully unlocked position. This is significant, because this feature is what prevents pressure plate 42 from moving vertically when the mechanism is in the unlocked position.

Figure 8:
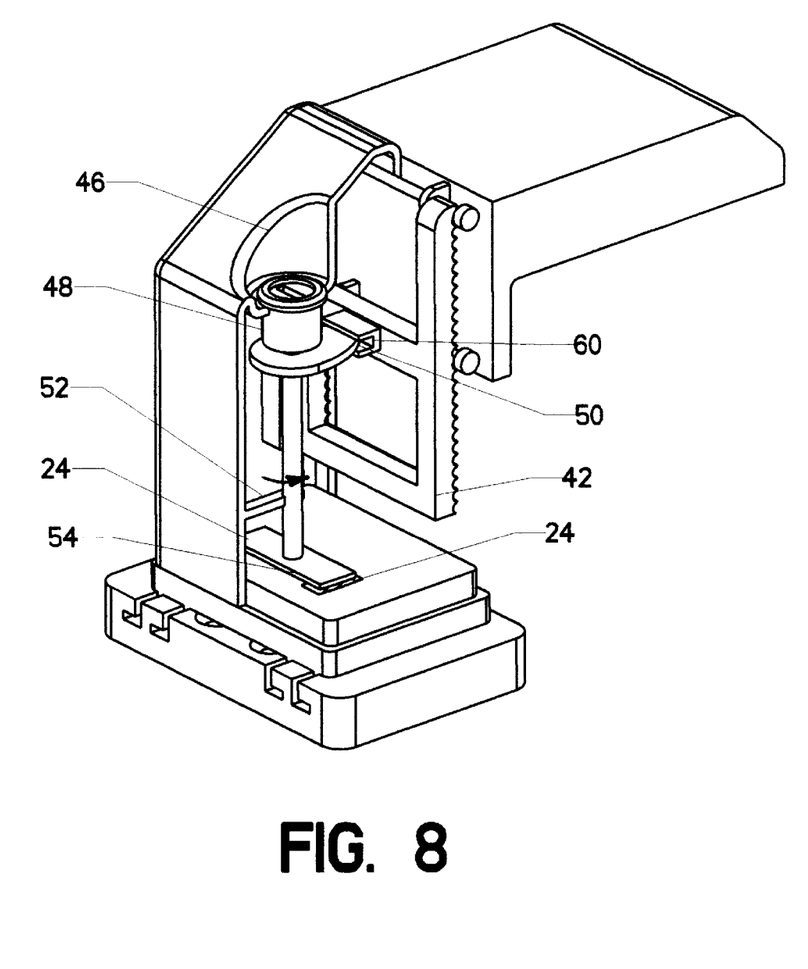
FIG. 8 is an isometric view with cutaways, showing the complete assembly in the latched position.

FIG. 8 illustrates lock 48 rotated to the fully locked position. The reader will observe that the interaction of rotary cam 50 and camming slot 60 has forced pressure plate 42 against pins 38. The reader will also observe that the rotation of latch plate 54 has forced the two latches 24 fully downward. Thus, clamp 34 is locked in position and foot 22 is locked to base 14. A single turn of lock 48 has fixed the position of the adjustable clamp 34 and locked the unit in place on base 14. It cannot be removed without the key.

Figure 9:
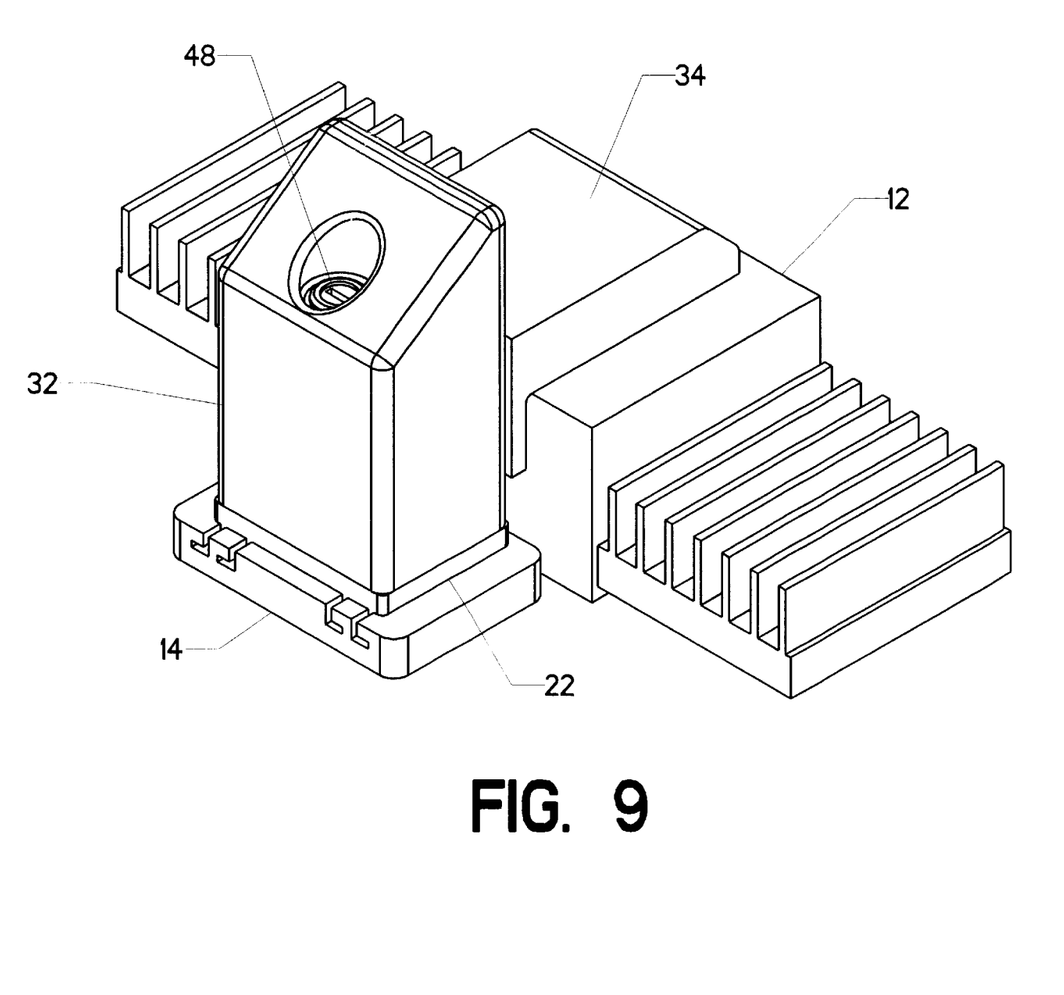
FIG. 9 is an isometric view, showing the invention clamping an amplifier in place.

FIG. 9 shows the invention in use. In this view, housing 32 is shown with no cutaway. With the key in the unlocked position, the user slides foot 22 onto base 14. Net, the user lowers clamp 34 until it rests against amplifier 12. Then the user turns lock 48 to the locked position—as shown. Clamp 34 is thereby locked in place. In addition, foot 22 is locked onto base 14. The result is that amplifier 12 may not be removed without the key to lock 48.

SUMMARY, RAMIFICATIONS, AND SCOPE

Accordingly, the reader will appreciate that the proposed invention allows a user to secure a variety of amplifiers against theft. The invention has further advantages in that it uses a single mechanism to both fix the adjustable component in place and lock the clamp to the power amplifier.

Although the preceding description contains significant detail, it should not be construed as limiting the scope of the invention but rather as providing illustrations of the preferred embodiment of the invention. As an example—even though the invention has been illustrated as mounting to a horizontal surface, it could easily be mounted to a vertical surface so as to lock an amplifier or other component in a different orientation. Thus, the scope of the invention should be fixed by the following claims, rather than by the examples given.

Having described my invention, I claim:

1. A device for adjustably securing an amplifier to a surface within a car, comprising:

a. a base, attached to said surface proximate said amplifier, having an upper surface, a lower surface, and connecting side walls, and having an undercut slot in said upper surface carrying out one of said side walls, and having a latch receptacle opening in said upper surface of said base;

b. a foot, having an upper surface, a lower surface, and connecting side walls, and having a cleat descending from said lower surface, with said cleat being positioned and sized to slidably engage said undercut slot in said base, so that said foot can only be engaged to said base by sliding said cleat into said undercut slot, and with said foot having a latch cavity passing completely through from said upper surface of said foot to said lower surface of said foot, with said latch cavity being directly over said latch receptacle of said base when said foot is slidably attached to said base;

c. a latch, having an upper portion and a lower portion, positioned within said latch cavity, with said lower portion being sized to fit tightly within said receptacle opening in said base, and with said latch being tightly fitted but vertically moveable within said latch cavity, so that when said latch is forced downward said lower portion protrudes downward into said latch receptacle of said base and thereby prevents said foot from sliding relative to said base, thereby preventing any movement of said foot with respect to said base;

d. means for lockably clamping said latch in said downward position so as to lock said foot to said base; and e. a clamp, adjustably attached to said foot, and positioned to bear against said amplifier so as to lock said amplifier against said surface of said car.

2. The device as recited in claim 1, wherein said means for lockably clamping said latch in said downward position comprises:

a. a rotatable and lockable shaft, rotatably attached to said foot, with said lockable shaft being oriented vertically, and with said lockable shaft being rotatable between an unlocked position and a locked position, and with said locakable shaft having a latch plate, oriented parallel to said upper surface of said foot, fixedly attached to its lower extremity, so that in said unlocked position said latch plate does not cover said latch cavity, and in said locked position said latch plate does cover said latch cavity;

b. a camming fin, integrally formed with said upper portion of said latch, so that as said lockable shaft is rotated to said locked position, thereby causing said latch plate to rotate over said latch cavity, said latch plate bears against said camming fin and forces said latch downward.

\* \* \* \* \*